Figure 1:
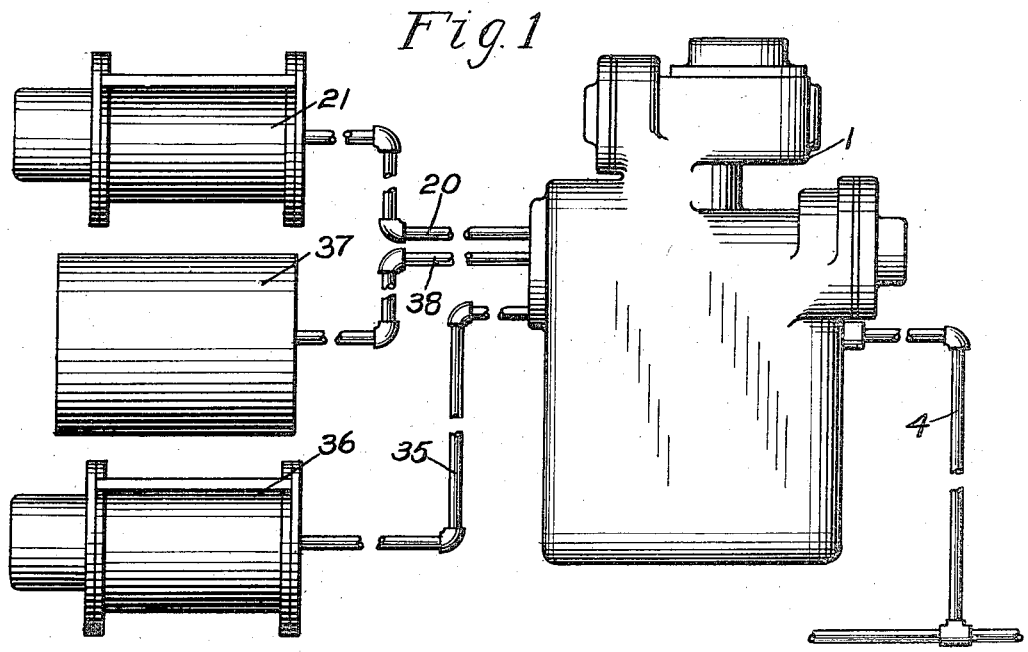

W. V. TURNER.
FLUID PRESSURE BRAKE APPARATUS.
APPLICATION FILED MAY 18, 1915.

1,241,582.

Patented Oct. 2, 1917.
2 SHEETS—SHEET 1.

WITNESSES
H. W. Crowell
G. M. Clements

INVENTOR
Walter V. Turner
by Wm. M. Cady
Att'y.

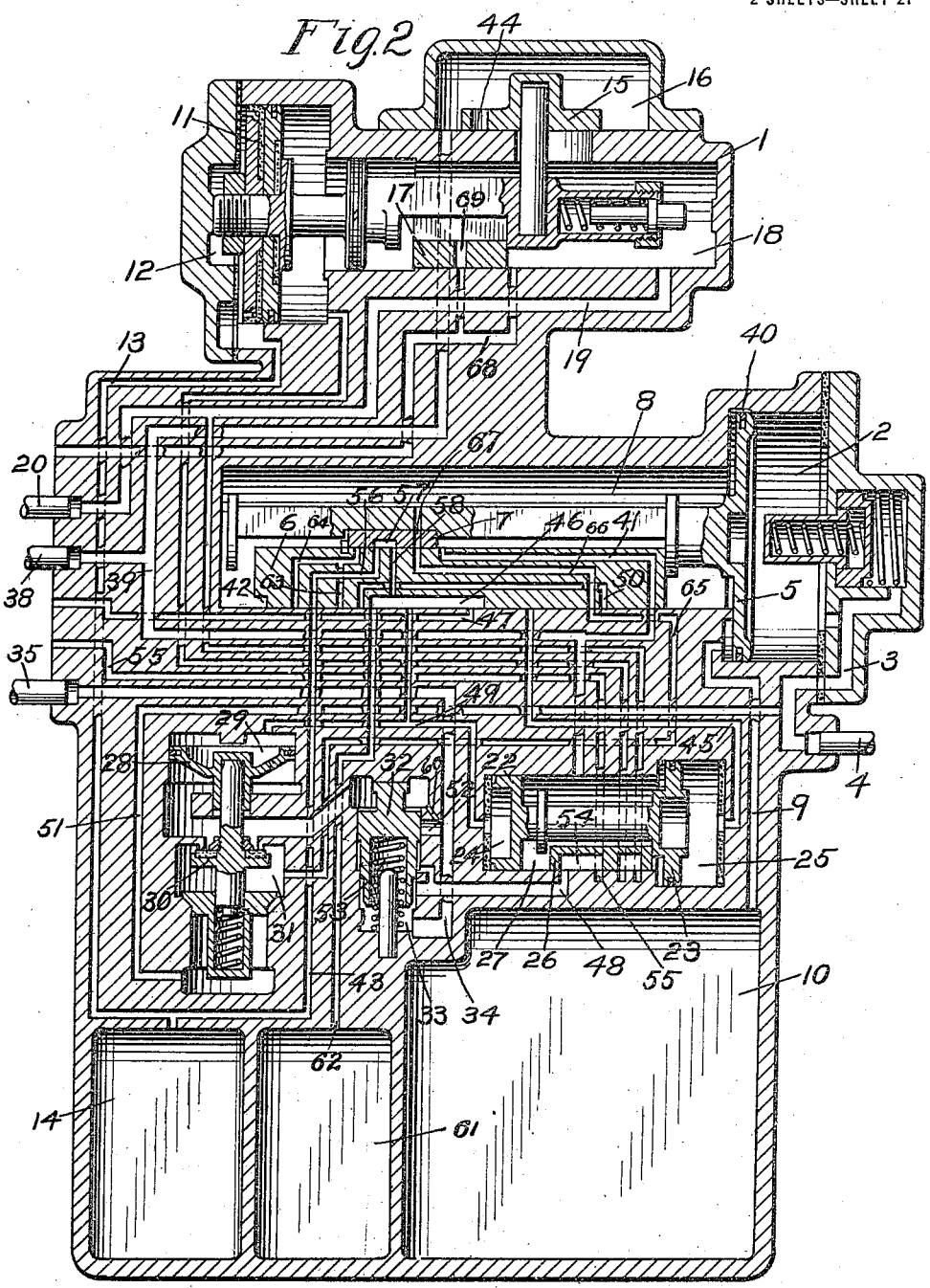

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,241,582.

Specification of Letters Patent.

Patented Oct. 2, 1917.

Application filed May 18, 1915. Serial No. 28,944.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and more particularly to a brake equipment adapted for securing a high braking power in an emergency application of the brakes.

The principal object of my invention is to provide an improved brake controlling valve device adapted to supply fluid to one brake cylinder in a service application of the brakes and to both the service brake cylinder and an emergency brake cylinder in an emergency application of the brakes.

In the accompanying drawings; Figure 1 is a diagrammatic view of a car air brake equipment embodying my invention, and Fig. 2 a central sectional view of the brake controlling valve device.

The brake controlling valve device may comprise, as shown in Fig. 2 of the drawings, a casing 1 having a piston chamber 2 connected by a passage 3 with brake pipe 4 and containing an equalizing piston 5, said piston being adapted to operate a main valve 6 and a graduating valve 7 contained in valve chamber 8, connected by passage 9 with a pressure chamber 10.

In addition to the equalizing portion, there is provided an application portion and an emergency portion, the application portion comprising a piston 11 contained in piston cylinder 12, connected by a passage 13 to an application chamber 14, and adapted to operate an application valve 15 contained in valve chamber 16, and a release valve 17, contained in valve chamber 18, which is connected by passage 19 and pipe 20 to service brake cylinder 21.

The emergency portion may comprise an emergency valve device having connected differential piston heads 22 and 23 contained respectively in piston chambers 24 and 25 and a slide valve 26 contained in valve chamber 27 and adapted to be operated by the differential piston. The emergency portion also includes a quick action valve device comprising a piston 28, contained in piston chamber 29, and a vent valve 30, contained in valve chamber 31, and adapted to be operated by piston 28.

According to my invention in an emergency application of the brakes, fluid is first vented from the brake pipe to the emergency brake cylinder and then from a source of fluid under pressure, and for this purpose a change over valve device is provided which preferably comprises a differential piston 32, having the chamber 33 at the small end, open to a passage 34 and pipe 35 leading to the emergency brake cylinder 36.

A supply reservoir 37 is connected by pipe 38 and a branched passage 39 to the application supply valve chamber 16 and emergency valve chamber 27.

In operation, air flows from the brake pipe 4 to equalizing piston chamber 2 and thence through the usual feed groove 40 to valve chamber 8, charging the pressure chamber 10 through passage 9.

Fluid also flows from valve chamber 8 through a port 41 in slide valve 6 and passage 39 to the supply reservoir 37.

When a sudden reduction in brake pipe pressure is made to effect an emergency application of the brakes, the piston 5 is shifted to emergency position, in which the tail port 42 registers with passage 43. Fluid is then supplied from valve chamber 8 to application chamber 14 and the piston cylinder 12, so that the application piston 11 is shifted to application position. This movement causes the valve 15 to open port 44 and fluid is supplied from the supply reservoir 37 to the service brake cylinder 21 through the passage 19.

Normally, the piston chamber 25 is charged with fluid under pressure by ordinary leakage from valve chamber 27 around the piston head 23, but when the equalizing piston moves to emergency position, passage 45 is connected by cavity 46 with exhaust passage 47. Fluid is thereupon vented from the piston chamber 25 and the fluid pressure acting in valve chamber 27 on the differential area of piston 23 operates to shift the emergency valve device to emergency position.

In this position, passage 48 is opened to valve chamber 27, so that fluid is admitted from the supply reservoir 37 to the change over valve device 32.

A branched passage 49 leading to quick action piston chamber 29 and to emergency piston chamber 24 is connected by a cavity 50 in the slide valve 6 to passage 39, so that fluid from the reservoir 37 is supplied to the quick action piston 28 which is then operated to open the vent valve 30.

This permits fluid from the brake pipe 4 to flow through passage 51, past vent valve 30, to the space above the change over valve 32 and the change over valve is thereupon actuated to open a port 52, leading to passage 34.

Fluid is consequently vented from the brake pipe to the emergency brake cylinder 36. Upon a predetermined reduction in brake pipe pressure by flow to the emergency brake cylinder, the fluid at supply reservoir pressure, acting on the differential area of the change over valve 32, in conjunction with the pressure of spring 53, operates to shift the change over valve to the upper position, closing the port 52 and connecting passage 48 with passage 34. Fluid from the supply reservoir 37 can now flow to the emergency reservoir until equalization takes place.

To release the brakes, the brake pipe pressure is increased so as to shift the equalizing valve device to release position, in which the branched passage 49 is connected by cavity 46 with exhaust passage 47.

The passage 45 being now blanked by the slide valve 6, fluid equalizes from valve chamber 27 into the emergency piston chamber 25 through the usual leakage around piston 23 and since the piston chamber 24 is open to the atmosphere, the unbalanced pressure acting on the emergency valve device operates to shift same to release position. The passage 48 is now connected by cavity 54 with an exhaust passage 55, so that fluid from the emergency brake cylinder is released.

Passage 13 is connected through passage 43, port 56, cavity 57 in the graduating valve 7, and port 58, with cavity 46, so that fluid is vented from the piston cylinder 12 to the atmosphere and the application piston 11 is thereupon shifted to release position, in which the service brake cylinder 21 is connected to the exhaust through a branched exhaust passage 68, one branch of which registers with port 69.

In order to prevent possible pocketing of fluid under pressure in the chamber above the change over valve 32 after the port 52 has been closed by the upward movement of the valve, a small equalizing port 60 may be provided which constantly affords communication from said chamber to the brake cylinder passage 34.

It will now be seen that a high braking power is obtained in an emergency application of the brakes by first venting fluid from the brake pipe to the emergency brake cylinder and then from the supply reservoir.

In order to prevent movement of the equalizing piston 5 to emergency position upon a gradual reduction in brake pipe pressure after the pressure chamber has been reduced to the pressure in the brake pipe; a reduction reservoir 61 is provided, which is connected by a passage 62 and a branch port 63 leading to service port 64 with the valve chamber 8 and pressure chamber 10 when the slide valve 6 moves beyond service position. Fluid is then vented from the pressure chamber to the reduction reservoir 61 and thus prevents movement to emergency position until the pressure chamber equalizes into the reduction reservoir.

Quick recharge of the pressure chamber is effected by providing a passage 65 leading from emergency check valve chamber 31 to the seat of slide valve 6 and adapted in release position to register with port 66 which in turn registers with port 67 in the auxiliary valve 7.

Having now described my invention, what I claim as new and desire to secure by Letters Patent, is:

1. In a fluid pressure brake, the combination with a brake pipe, a service brake cylinder, and a valve mechanism operated upon a gradual reduction in brake pipe pressure for supplying fluid to said brake cylinder, of an emergency brake cylinder and means operated in an emergency application of the brakes for first venting fluid from the brake pipe to the emergency brake cylinder and then from a source of fluid under pressure.

2. In a fluid pressure brake, the combination with a brake pipe, a service brake cylinder, and a valve mechanism operated upon a gradual reduction in brake pipe pressure for supplying fluid to said brake cylinder, of an emergency brake cylinder, a reservoir normally charged with fluid under pressure, and means operated upon an emergency application of the brakes for first venting fluid from the brake pipe to said emergency brake cylinder and then from said reservoir.

3. In a fluid pressure brake, the combination with a brake pipe, a service brake cylinder, a reservoir normally charged with fluid under pressure, and a valve mechanism operated upon a gradual reduction in brake pipe pressure for supplying fluid from said reservoir to the brake cylinder, of an emergency brake cylinder, and means operative upon a sudden reduction in brake pipe pressure for first supplying fluid from the brake pipe to the emergency brake cylinder and then from said reservoir.

4. In a fluid pressure brake, the combination with a brake pipe, a service brake cylinder and an emergency brake cylinder, of a quick action valve device operated upon a sudden reduction in brake pipe pressure for venting fluid from the brake pipe and a change over valve device operated by flow of fluid vented from the brake pipe for opening communication from the brake pipe to the emergency brake cylinder, said change over valve device being operated at a predetermined reduction in brake pipe pressure for opening communication from another source of fluid under pressure to the emergency brake cylinder.

5. In a fluid pressure brake, the combination with a brake pipe, a service brake cylinder, an emergency brake cylinder, and a reservoir normally charged with fluid under pressure, of a quick action valve device operated upon a sudden reduction in brake pipe pressure for venting fluid from the brake pipe, and a change over valve device subject on one side to the flow of fluid vented from the brake pipe and on the opposite side to reservoir pressure for first opening communication for venting fluid from the brake pipe to the emergency brake cylinder and then operating upon a predetermined reduction in brake pipe pressure for opening communication from the reservoir to the emergency brake cylinder.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."